United States Patent [19]

Mees et al.

[11] 3,778,556

[45] Dec. 11, 1973

[54] TELEPHONE SIGNALING AND TESTING APPARATUS WITH PROVISIONS FOR EITHER PULSE OR MULTIFREQUENCY DIALING

[75] Inventors: James G. Mees, Saratoga; Andre Lubarsky, Jr.; Goro R. Tahara, both of Sunnyvale, all of Calif.

[73] Assignee: Telecommunications Technology, Inc., Palo Alto, Calif.

[22] Filed: July 2, 1971

[21] Appl. No.: 159,446

[52] U.S. Cl. ....... 179/90 K, 179/90 R, 179/175.2 R

[51] Int. Cl. .......... H04m 1/30

[58] Field of Search .......... 328/48, 37; 340/359, 340/365 R, 365 S; 179/90 R, 90 K, 90 B, 175.2 R, 175.2 A, 84 VF

[56] References Cited

UNITED STATES PATENTS

| | | | |
|---|---|---|---|
| 3,422,229 | 1/1969 | Wallace | 179/90 B |
| 2,373,134 | 4/1945 | Massonneau | 340/359 |
| 2,428,089 | 9/1947 | Mumma | 340/359 |
| 3,538,263 | 11/1970 | Midis | 179/90 B |
| 2,832,951 | 4/1958 | Browne | 340/359 |
| 3,482,058 | 12/1969 | Guennou | 179/90 BB |
| 3,581,216 | 5/1971 | Stevenson | 179/90 R |
| 3,588,362 | 6/1971 | Kass | 179/90 B |
| 3,555,201 | 1/1971 | Kuehnle | 179/90 B |
| 3,601,552 | 8/1971 | Barnaby | 179/90 B |
| 3,670,111 | 6/1972 | Bukosky | 179/90 B |
| 3,614,331 | 10/1971 | Hoekstra | 179/90 K |
| 3,692,962 | 9/1972 | Raczynski | 179/175.2 R |

*Primary Examiner*—Kathleen H. Claffy
*Assistant Examiner*—Thomas D'Amico
*Attorney*—Karl A. Limbach et al.

[57] ABSTRACT

Telephone signaling and testing apparatus is provided to generate either dial pulse coded signals or multiple frequency coded signals for use in signaling or testing along transmission lines.

17 Claims, 5 Drawing Figures

INVENTORS
JAMES G. MEES
ANDRE LUBARSKY JR.
GORO R. TAHARA

BY Limbach, Limbach and Sutton
ATTORNEYS

INVENTORS
JAMES G. MEES
ANDRE LUBARSKY JR.
GORO R. TAHARA

BY Limbach, Limbach and Sutton
ATTORNEYS

INVENTORS
JAMES G. MEES
ANDRE LUBARSKY JR.
GORO R. TAHARA

BY Limbach, Limbach and Sutton
ATTORNEYS

INVENTORS
JAMES G. MEES
ANDRE LUBARSKY JR.
GORO R. TAHARA

BY Limbach, Limbach & Sutton
ATTORNEYS

TELEPHONE SIGNALING AND TESTING APPARATUS WITH PROVISIONS FOR EITHER PULSE OR MULTIFREQUENCY DIALING

BACKGROUND OF THE INVENTION

The present invention relates to telephone signaling and testing and in particular to apparatus for providing either dial pulse coded signals or multiple frequency coded signals from a single piece of equipment.

Telephone signaling today is done by one of two procedures. The first is commonly referred to as dial pulse signaling and the second, multiple frequency signaling. In dial pulse signaling each digit, N, is represented by a sequence of N pulses. Thus, the digit 1 is assigned a single pulse and the digit 9 is assigned nine pulses. Upon the selection of a digit, these pulses are sequentially sent down the telephone transmission line.

A more recent innovation is the use of multiple frequency signaling. Two such examples of multiple frequency signaling schemes are "multi-freq" and "touch tone." The former is used on many long distance trunk lines, particularly where stored and/or translated numerical information is used. "Touch tone" is encountered frequently in subscriber signaling.

In multiple frequency signaling systems, pulse signals are not sent sequentially as is the case for dial pulse signaling, but rather a single pulse, comprising a unique combination of two of a total of six possible tones, i.e., signals of different frequencies is provided. For example, in "multi-freq" signaling, different combinations of two out of six tones are used to represent different digits. Multiple frequency signaling is considerably faster than the sequential method of dial pulse signaling since multiple frequency tone pulses may be of approximately the same duration as each dial pulse, but each two-tone pulse, in multi-frequency signals, conveys one complete digit, while one to ten pulses and pauses are required for each digit in dial pulse or sequential signaling.

A typical dial pulse signal generator is the ordinary telephone having a rotary dial. When a dial is rotated and released a pulse train is generated as the dial rotates to its original position. The generation of the pulses is done by mechanical switching. Similarly, mechanical switching is presently used in multiple frequency signaling such as in "touch-tone" telephones. When a digit is selected mechanical switching combines, from appropriate oscillators the tones corresponding to the selected digit.

Unless completely separate signaling systems are installed, presently it is only possible to provide telephone signaling by one of the two techniques described above. There are many situations when it would be desirable to be able to signal by multiple frequency techniques or by dial pulse techniques or by a combination of the two. For example, multiple frequency signaling is advantageous where previously collected and stored information must be signaled to some further storage or translation point, or where the receiving central office has common controlled type switching apparatus which may receive and use multiple frequency pulsing information without further conversion.

With the use of the two signaling techniques described above, testing and testing equipment cannot be achieved easily with a single piece of equipment. This is particularly disadvantageous since, as pointed out above, multiple frequency and dial pulse systems are both frequently encountered. And while there is equipment available for converting between multiple frequency signaling and dial pulse signaling, such apparatus is very complicated and expensive.

SUMMARY OF THE INVENTION

It is therefore an object of the invention to provide a telephone signal generating system which is capable of providing both dial pulse and multiple frequency signals.

A further object of the invention is to provide a telephone testing generator wherein it is possible to provide either dial pulse or multiple frequency test signals from a single piece of equipment.

A further object of the invention is to provide telephone signal generating apparatus which can easily be converted for either dial pulse or multiple frequency applications.

Still another object of the invention is to provide a digitally operating dial pulse generator.

Another object of the invention is to provide a digitally operating multiple frequency signal generator.

Another object of the invention is to provide telephone signaling and testing apparatus capable of providing multiple frequency and dial pulse signals whose parameters can be varied over a large range.

In accordance with the invention a single piece of telephone signaling apparatus is provided which can be operated in either a dial pulse or in a multiple frequency mode of operation.

In the preferred embodiment of the invention, a single keyboard having the desired digits and/or characters is provided. When a digit is pressed on the keyboard, one of two different types of circuits is activated depending upon which is selected. In the first, a multiple frequency signal is provided corresponding to the selected digit and/or character and in the second, a train of pulses is provided corresponding in number to the digit selected.

In the case of multiple frequency signal operation, the digit signalled from the keyboard activates suitable logic circuitry for enabling a gate which then combines the outputs of two of six oscillators. Each oscillator provides an output signal having a different tone or frequency. Thus, each of the digits and/or characters is represented by the unique combination of two oscillator signals.

During dial pulse or sequential operation, when a digit N is selected it is entered in a shift register and at the same time an oscillator is activated. The oscillator provides two functions. First, it acts as a timing or clock source to count down or shift the binary digit entered in the shift register. Secondly, the pulses from the oscillator are used to provide the dial pulse signaling pulses themselves. After the register has been shifted down N positions, means are provided to disable the oscillator. With this arrangement, the oscillator provides a sequence of pulses corresponding in number to the digit selected.

For example, if the number selected is 4, after the digit is entered in the binary counter, its position in the counter is shifted and is counted down four positions and then the oscillator is disabled. As a result, the oscillator provides four dial pulses.

In an alternate embodiment, the expense of constructing the dial pulse portion of the telephone signaling apparatus is reduced by providing, during dial pulse operation; (1) the first pulse of any pulse sequence; and (2) a pulse for the digit 1; in a separate and independent manner from the way by which the remaining pulses are provided. Thus, in accordance with this embodiment of the invention, when the digit 1 is selected, means, such as a monostable multivibrator, is triggered to provide the single pulse. Similarly, when a digit, N, greater than 1 is selected, the first pulse provided by the dial pulse scheme is provided by the same multivibrator. The shift register is then counted down N-1 positions by the clock means, and hence all of the other pulses, except for the first pulse, is provided from this clock means. The advantage of this system is that it reduces the number of shift registers required in one particular embodiment which saves considerable expense in construction of the circuit of the present invention.

The pulses provided by the oscillator can be modified in several ways, in accordance with the invention, to provide the desired amplitude, pulse width and pulse separation. Similarly, the duration and amplitude of the multiple frequency pulses are also variable in accordance with the invention.

The apparatus of the present invention lends itself to many applications. For example, the system can be used as prime signal transmitting equipment or in various testing applications. Additionally, the system can be used by a subscriber where it is desired to have the capability of either dial pulse or touch tone operation. Another example where the system is applicable as subscriber equipment is where the apparatus is used to communicate with computer terminals. More specifically, the dial pulse portion of the system can be used to call up the computer terminal from the subscriber location and then the multiple frequency section can be used for keying information into the terminal.

In another example, if the apparatus of the present invention is equipped with a low speed scanning device and a comparative device it can be used as a remote call unit, i.e., at some location with a sensing device one could call a particular telephone number and upon response from the called number start translating information.

The invention can also be used for testing multiple frequency or dial pulse telephone systems. Because of the ability to vary signal parameters such as amplitudes, pulse widths, and pulse separations in the case of dial pulse operation and amplitude, pulse duration and oscillator frequencies in the case of multiple frequency operation; the system is particularly well adapted for this purpose.

DESCRIPTION OF THE PREFERRED EMBODIMENTS

Figure 1A:
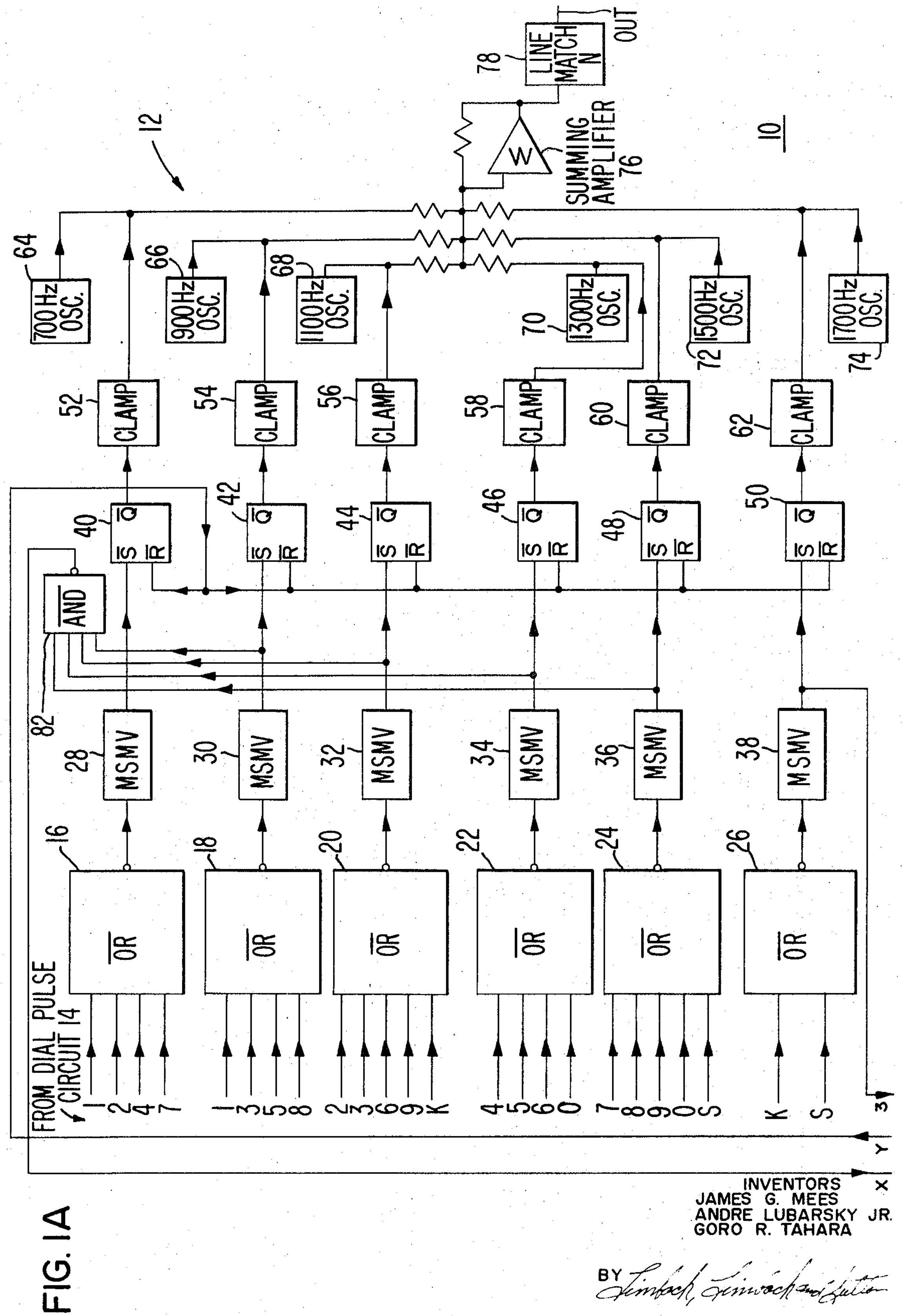
FIG. 1A is a block schematic diagram of the multiple frequency portion of one embodiment of the present invention.
Figures 1B, 1C:
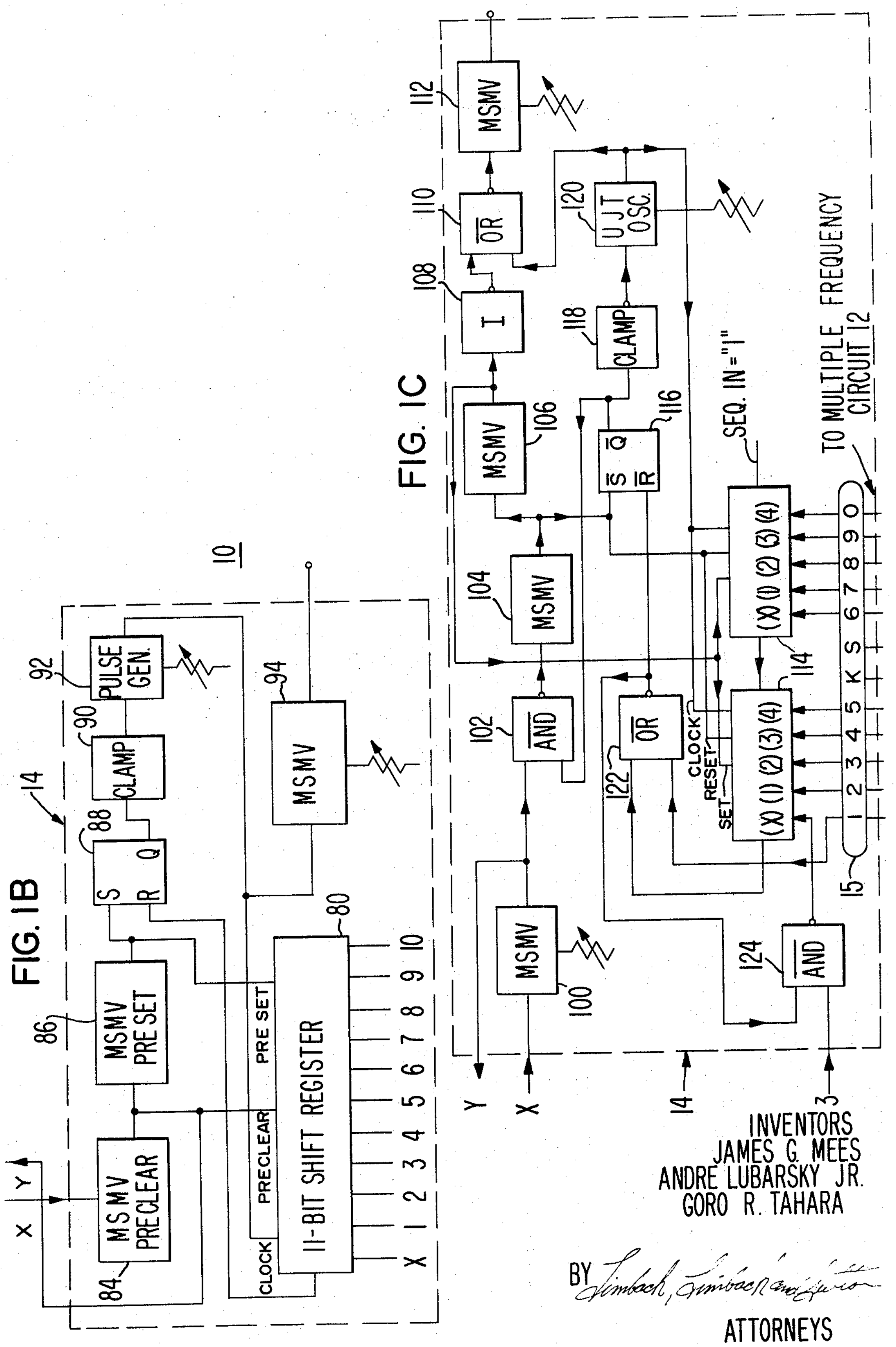
FIG. 1B is a block schematic diagram of one embodiment of the dial pulse portion of the present invention.
FIG. 1C is a block schematic diagram of another embodiment of the dial pulse portion of the present invention.

Referring to FIGS. 1A and 1B, there is shown therein the block diagram of a telephone signaling apparatus 10 which includes a multiple frequency circuit 12 and a sequential or dial pulse circuit 14.

The outputs from the keyboard switch, 15, are connected to selected decoding gates such as NOR gates 16, 18, 20, 22, 24, and 26. As can be seen, connected from the keyboard 15 to NOR gate 16 are the digit lines for digits 1, 2, 4, and 7; for NOR gate 18, digital lines 1, 3, 5, and 8; for NOR gate 20 digit lines 2, 3, 6, 9, and K; NOR gate 22 digit lines 4, 5, 6, and 0, NOR gate 24 digit lines 7, 8, 9, 0 and S, and for NOR gate 26 character lines K and S. The outputs from these NOR gates in turn drive monostable multivibrators 28, 30, 32, 34, 36, and 38 respectively.

The outputs of each of the monostable multivibrators are connected respectively to the $\overline{S}$ inputs of $\overline{S}$-$\overline{R}$ flip-flops 40, 42, 44, 46, 48 and 50. The $\overline{Q}$ output from the $\overline{S}$-$\overline{R}$ flip-flops are used to enable and disable clamp circuits 52, 54, 56, 58, 60 and 62, respectively, which in turn enable and disable respectively oscillators 64, 66, 68, 70, 72, and 74. The outputs from these oscillators are connected together through resistors to the input to a summing amplifier 76. The output from the summing amplifier 76 goes through a line matching network 78 before being sent out of the multiple frequency circuit 12.

As explained previously, in operation, when a digit and/or character is selected the multiple frequency circuit 12 provides an output pulse signal comprising a combination of a pair of tones or signals of different frequencies. Thus each time a digit is selected two of the six oscillators 64, 66, 68, 70, 72, 74 are combined at the summing amplifier 76 to be sent out from the circuit 12.

The actual combination of tones from the oscillators for multi-freq applications is summarized for each of the input digits and/or characters in Table 1 below:

TABLE 1

| Digit and/or Character | Tones (HZ) | Oscillator |
|---|---|---|
| 1 | 700 + 900 | 64 + 66 |
| 2 | 700 + 1100 | 64 + 68 |
| 3 | 900 + 1100 | 66 + 68 |
| 4 | 700 + 1300 | 64 + 70 |
| 5 | 900 + 1300 | 66 + 70 |
| 6 | 1100 + 1300 | 68 + 70 |
| 7 | 700 + 1500 | 64 + 72 |
| 8 | 900 + 1500 | 66 + 72 |
| 9 | 1100 + 1500 | 68 + 72 |
| 0 | 1300 + 1500 | 70 + 72 |
| K | 1100 + 1700 | 72 + 74 |
| S | 1500 + 1700 | |

The combination of pairs of oscillators is selected by the NOR gates. Table 2 below summarizes the equations which describe the logic formed by the NOR gates 16, 18, 20, 22, 24 and 26.

TABLE 2

$\overline{A} = \overline{1 + 2 + 4 + 7}$,
$\overline{B} = \overline{1 + 3 + 5 + 8}$,
$\overline{C} = \overline{2 + 3 + 6 + 9 + K}$,
$\overline{D} = \overline{4 + 5 + 6 + 0}$,
$\overline{E} = \overline{7 + 8 + 9 + 0 + S}$,
$\overline{F} = \overline{K + S}$.

It is to be understood, of course, that other forms of logic could be used to effectuate the invention but it has been found that this approach is more economical considering the interface between this circuit and the dial pulse circuit 14 since they share a common keyboard switch 14 as an input driver.

The specific operation of this circuit can best be understood by taking a specific example. The outputs from the NOR gates 16, 18, 20, 22, 24 and 26 are normally "high" as opposed to a "low" state. Reference to "high" and "low" refer to binary states, and are synonomous with other expressions for binary states such as binary 1 and 0, etc., and will be used synonomously throughout this patent application.

If, for example, the digit 5 is selected, the outputs from NOR gate 18 and NOR gate 22 go "low" or to a 0 binary state. This triggers the monostable multivibrators 30 and 34 which in turn provides a pulse to the $\overline{S}$ inputs of flip-flops 42 and 46 respectively. This changes the state at the output $\overline{Q}$ of each of these flip-flops. When this occurs, the clamp circuits 54 and 58, which normally prevent the outputs from oscillators 66 and 70 from being fed to the summing amplifier 76, are disabled thereby allowing the outputs from oscillators 66 and 70 to be fed to summing amplifier 76. Thus, a two-tone composite output signal, 900 Hz and 1,300 Hz, is provided for the digit 5. In a similar manner, pairs of oscillator signals are provided for each of the other digits and characters.

The monostable multivibrators 28, 30, 32, 34, 36 and 38 eliminate any problems with contact bounce from the input and also remove the possibility of holding a pair of tones on for a longer time than required.

The logical operation of the $\overline{S}$-$\overline{R}$ flip-flops is summarized in Table 3 which follows. For purposes of illustration, the logic for an S-R flip-flop is shown for comparison.

TABLE 3

| $\overline{S}$-$\overline{R}$ Flip-Flops | | | S-R Flip-Flops | | |
|---|---|---|---|---|---|
| $\overline{S}$ | $\overline{R}$ | $\overline{Q}$ | S | R | Q |
| 0 | 0 | X | 0 | 0 | NC |
| 0 | 1 | 0 | 0 | 1 | 0 |
| 1 | 0 | 1 | 1 | 0 | 1 |
| 1 | 1 | NC | 1 | 1 | X |

NC = No change
X = not allowed

Reference is now made to FIG. 1B illustrating one embodiment of the digital dial pulse circuit 14. As previously stated, the keyboard 15 is common to both the multiple frequency and dial pulse sections of the system. Thus, during dial pulse operation, when a digit is selected the keyboard switching network enters the selected digit in a shift register 80. As can be seen by reference to FIG. 1B, each digit is assigned one binary position within the shift register 80. Further, the position is chosen so that a digit must be shifted down N positions before it reaches the end position, X, of the shift register 80.

Connected to the outputs of monostable multivibrators 28, 30, 32, 34, 36 and 38 is a NAND gate 82 (FIG. 1A). As is well known to those in the art, a NAND gate provides a binary 1 output unless all of the inputs to it are binary 1's in which case it provides a binary 0. Since the outputs from these multivibrators are normally high, the output from the NAND gate 82 is normally low. However, whenever a button is depressed on the keyboard 15, the NAND gate 82 switches states from a binary 0 to a binary 1.

This change of state is detected by monostable multivibrator 84. Multivibrator 84 provides an output pulse which serves three functions. First, it is utilized by the multiple frequency circuit 12 to reset the appropriate flip-flops 40, 42, 44, 46, 48 and 50 to enable clamp 52 and thereby prevent the outputs from the appropriate oscillators from reaching the summing amplifier 76. Thus, in this capacity, it acts to determine the pulse duration in the multiple frequency circuit 12.

Secondly, the signal from multivibrator 84 clears register 80 of any previously stored information. It does this by providing a preclear pulse signal to the register 80. Third, the same pulse is also used to trigger another monostable multivibrator 86. The output from this multivibrator provides a preset or enable pulse to the shift register 80 so that the register 80 is able to accept a digit entered in one of the positions of the register.

The duration of the output pulse from multivibrator 86 is selected to be longer than the duration of the output from the multivibrator 84. This insures that a newly entered digit remains entered and is not cleared out by the signal from multivibrator 84. Further, the duration of the preclear signal from multivibrator 84 is selected to be considerably shorter than the shortest possible time it takes one to depress a button on the keyboard 15. In other words, the amount of time that it takes an individual to press down a key button, even if he tries to do it in the shortest period of time possible, is considerably longer than the pulse width from the multivibrator 86. In one embodiment the pulse width from multivibrator 84 was 0.5 microseconds and the pulse width from 86 was 3 microseconds.

The output from the multivibrator 86 also goes to the S terminal of a flip-flop 88. This changes the state of the output Q therefrom which disables a clamp circuit 90 to allow the output from the pulse generator 92 to go to the input of another monostable multivibrator 94. Multivibrator 94, whose amplitude, pulse width, and pulse spacing is variable, provides the final output pulses.

The pulse generator 92 provides clock pulses to the register 80 to shift the position of the entered digit N, N times. After having been shifted N times, to the last position X of the shift register, a signal is provided from the shift register 80 to the reset terminal of flip-flop 88. This causes the clamp circuit 90 to once again disable the output from the pulse generator. In this manner, a pulse train of N pulses, corresponding to the digit N, is provided.

An 11 bit shift register is presently not available at low cost. The embodiment of the invention shown in FIG. 1C and also in the detailed schematic diagram of FIG. 2 employs a comparatively inexpensive, commercially available dual 5-bit shift register 114. The digit 1 as well as the first pulse in any pulse sequence is provided independently of the shift register 114 since it only as 10 positions as compared with the required 11 positions. In particular, the digit 1, and the first pulse in any pulse sequence is generated when the keyboard button is pushed for the desired digit. The remaining pulses in a pulse sequence are generated in a manner similar to that for the circuit of FIG. 1B. Namely, a shift register is shifted down by a pulse generator and these pulses are used as the output dial pulses of the circuit. Of course, since the first pulse is provided independently of the shift register, the shift register is only shifted N-1 times rather than N times as was the case for the embodiment of FIG. 1B.

Referring now to FIG. 1C, when a button on the keyboard 15 is depressed, the output of NAND gate 82 changes as explained previously and monostable multivibrator 100 is triggered. The normally low output of multivibrator 100 is then shifted temporarily to a high state and sent to NAND gate 102. The output of NAND gate 102, which is also normally high, goes low, triggering another monostable multivibrator 104. The output from multivibrator 104 triggers another multivibrator 106 which, after going through an inverter 108 and a NOR circuit 110 triggers another monostable multivibrator 112 which provides the final output pulse. Thus, the first pulse for any pulse train is created in this manner.

The output from multivibrator 104 also goes to the shift register 114 to clear any information previously stored therein. The output from multivibrator 106 also goes to the shift register 114 to enable the register so that a binary digit can be stored in the shift register. As in the case of the embodiment shown in FIG. 1B, the duration of the output pulse from the multivibrator 106 must be greater than the duration of the pulse from multivibrator 104.

The $\overline{S}$ input to flip-flop 116 is normally high and the $\overline{R}$ input to the flip-flop 116 is normally low. The output from multivibrator 104 is normally high. Thus, when there is a change of state in the output of multivibrator 104, i.e., when a digit is selected, the output of multivibrator 104 goes low. Referring to FIG. 3, it can be seen that this provides a disallowed pair of inputs to the $\overline{R}$-$\overline{S}$ flip-flop 116. Thus, flip-flop 116 maintains its original state after the disallowed condition has passed. This means that the clamp circuit 118 continues to clamp the output from a unijunction transistor oscillator 120. Since oscillator 120 corresponds to the pulse generator 92 of FIG. 1B, no output is provided from the oscillator for the first pulse nor is any clock signal provided from the oscillator to the shift register 114.

The operation of the circuit of FIG. 1C is similar to the above when the digit 1 is selected. When a digit 1 is selected, the shift register 114 is bypassed and the pulse from the keyboard 15 goes through a NOR gate 122 to insure that the flip-flop 116 is at a state to keep the oscillator 120 clamped. The output from NOR gate 122 is also sent to a NAND gate 124 to insure that there is always a digit stored in the last position of the shift register 114. An input is also provided to NAND gate 124 from the output of monostable multivibrator 38 (FIG. 1A) so that a digit is stored in the last position of register 114 any time that a character K or S is provided. A K signal is used at the beginning of any signaling sequence in multiple frequency operation and an S signal is provided at the end of any sequence.

In a situation where a digit other than 1 has been selected, the sequence for the remaining pulses after the first pulse has been provided is as follows. The selected digit, N, is entered in the shift register 114. Once the counter 114 is reset the last position of the shift register, (O) becomes a binary 0. This causes a change in the $\overline{R}$ input to flip-flop 116 which in turn changes the output state of the flip-flop 116 and causes the clamp 118 to be disabled, thereby enabling the oscillator 120.

The oscillator 120 takes approximately one cycle to warm up, i.e., the time it takes for the first pulse of the pulse sequence to be issued. Once the oscillator is warmed up it provides clock pulses to the register 114 in the same manner as the pulse generator 92 in the circuit of FIG. 1B. As explained, the oscillator 120 then causes the entered binary digit in the shift register to shift down to the last position in the shift register. Since the first pulse is provided by other means than the shift register, the position of the entered digit is selected so that the shift register must be shifted N-1 times before the originally placed binary digit is in the last position of the shift register.

The output from the oscillator 120 is also sent to NOR gate 110 which triggers the multivibrator 112 to provide the final output pulses.

Figure 2A:
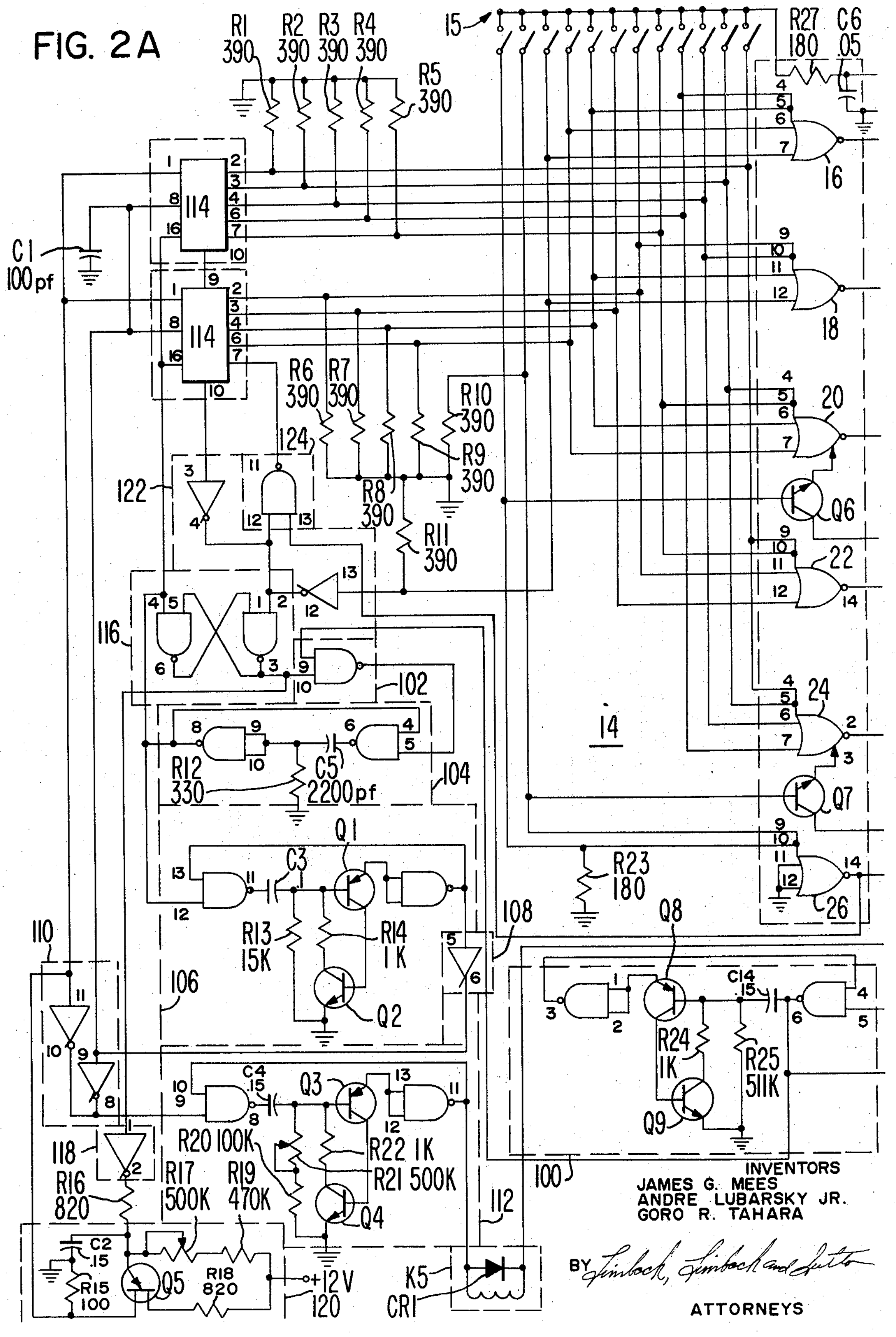
FIGS. 2A and 2B taken together is a detailed schematic diagram illustrating one embodiment of FIGS. 1A and 1B.
Figure 2B:
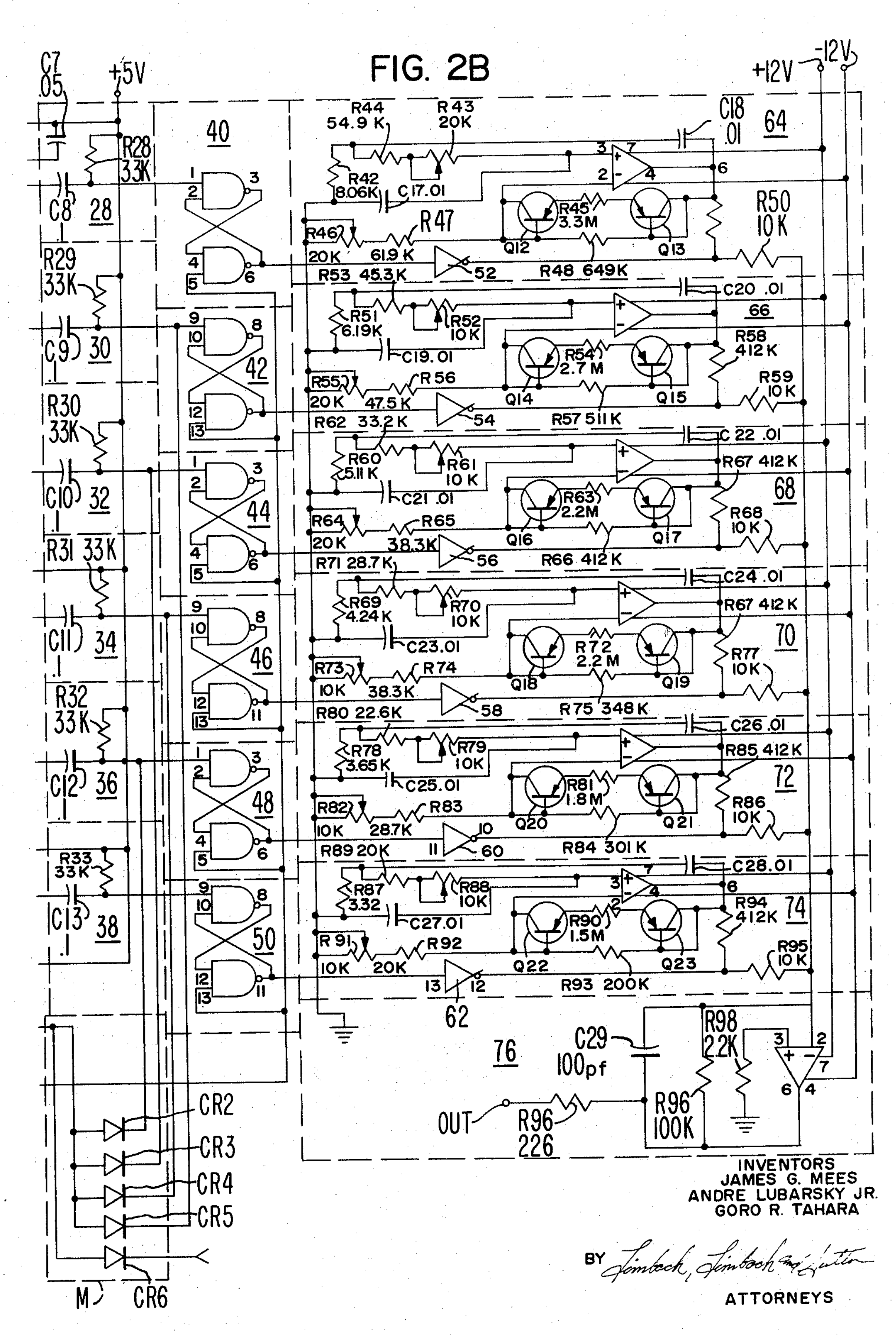

Referring now to FIG. 2, the duty cycle of the dial pulse circuit 14 is varied by adjusting variable resistor R21. The repetition rate of the dial pulse output is varied by adjusting variable resistor R17. The tone duration is determined by adjusting R25.

The frequency of each of the oscillators can be adjusted for purposes of calibration by adjusting variable resistances R43, R52, R61, R70, R79, and R88, for respectively, oscillators 64, 66, 68, 70, 72, and 74.

Other variations are also encompassed by the present invention. For example, the present single shift register in the dial pulse portion of the invention can be replaced with a shift register for each of the digits and/or characters. Each register is connected to the keyboard 15. The registers are sequentially enabled as each of the digits is selected, thereby providing each of the registers with a separate digit. Once all of the digits have been entered in their respective registers, the registers are sequentially counted down so that a back-to-back series of pulse trains representing the selected digits is provided.

Thus, with this arrangement, it is possible to store, for example, a complete telephone number. Each digit of the number is stored in a separate shift register. When it is desired to send out the number the counters are sequentially cycled. This requires far less time for sending out a sequence of dial pulse coded digits.

What is claimed is:

1. Manually operated telephone signaling and/or testing apparatus comprising:

a. a master push-button digit and/or character keyboard whose push-buttons are manually and sequentially activated;

b. means responsive to said keyboard for generating a plurality of pulse coded signal sequences, each pulse sequence having a number of pulses corresponding to designated digits and/or characters, and wherein said pulse signal generating means provides N-pulses for a push-button whose numerical value is N, and includes:

i. means for providing a single output pulse whenever any push-button is selected;

ii. a shift register;

iii. means for entering a binary digit in said shift register when a push-button is selected, whose numerical value N is greater than 1;

iv. clock means for providing pulses upon the selection of a desired digit and/or character to shift down the binary digit entered in said shift register;

v. means for disabling said clock means when the initially selected binary digit is shifted down N−1 positions; and vi. means for providing an output pulse each time said shift register is shifted one position;

c. means responsive to said keyboard for generating frequency-coded signals corresponding to predetermined designated digits and/or characters; and d. means for selectively connecting said keyboard with either said frequency coded signal generating means or to said pulse generating means.

2. Apparatus as in claim 1 wherein said frequency coded signal generating means comprises means for generating a plurality of signals, each comprising a unique combination of signals, said latter signals each being characterized as being of a different frequency.

3. Apparatus as in claim 1 wherein said frequency coded signal generating means comprises digital means for providing a unique composite signal for each designated digit and/or character.

4. Apparatus as in claim 3 wherein said composite signal comprises a combination of a pair of different frequency signals.

5. Apparatus as in claim 2 wherein said digital means includes a plurality of oscillators, each providing an output signal at a different frequency and means for selecting pairs of said output signals to form said unique combinations.

6. Apparatus as in claim 5 wherein said plurality of oscillators comprises six oscillators.

7. Apparatus as in claim 5 including means for varying the duration of each of said unique combination of signals.

8. Apparatus as in claim 5 including means for varying the amplitude of each of said unique combination of signals.

9. Apparatus as in claim 1 wherein the pulses from said clock means provide said output pulses.

10. Apparatus as in claim 9 including means for varying the pulse widths of said pulses.

11. Apparatus as in claim 10 including means for varying the time interval between pulses.

12. Apparatus as in claim 9 including means for varying the time interval between pulses.

13. Digital telephone signaling and/or testing apparatus for providing dial pulse telephone signals from a push-button keyboard operation, said signals being characterized as having N-pulses for a push-button whose numerical value is N, comprising:

a. means for providing a single output pulse whenever any push-button is selected;
b. a shift register;
c. means for entering a binary digit in said shift register when a push-button is selected, whose numerical value is greater than 1;
d. clock means for providing pulses upon the selection of a desired digit and/or character to shift down the binary digit entered in said shift register;
e. means for disabling said clock means when the initially selected binary digit is shifted down N−1 positions; and
f. means for providing an output pulse each time said shift register is shifted one position.

14. Apparatus as in claim 13 wherein the pulses from said clock means provide said output pulses.

15. Apparatus as in claim 14 including means for varying the pulse widths of said pulses.

16. Apparatus as in claim 15 including means for varying the time interval between pulses.

17. Apparatus as in claim 14 including means for varying the time interval between pulses.

* * * * *